Aug. 19, 1969     P. N. SMITH     3,462,568
SEAM DETECTOR APPARATUS
Filed July 19, 1967
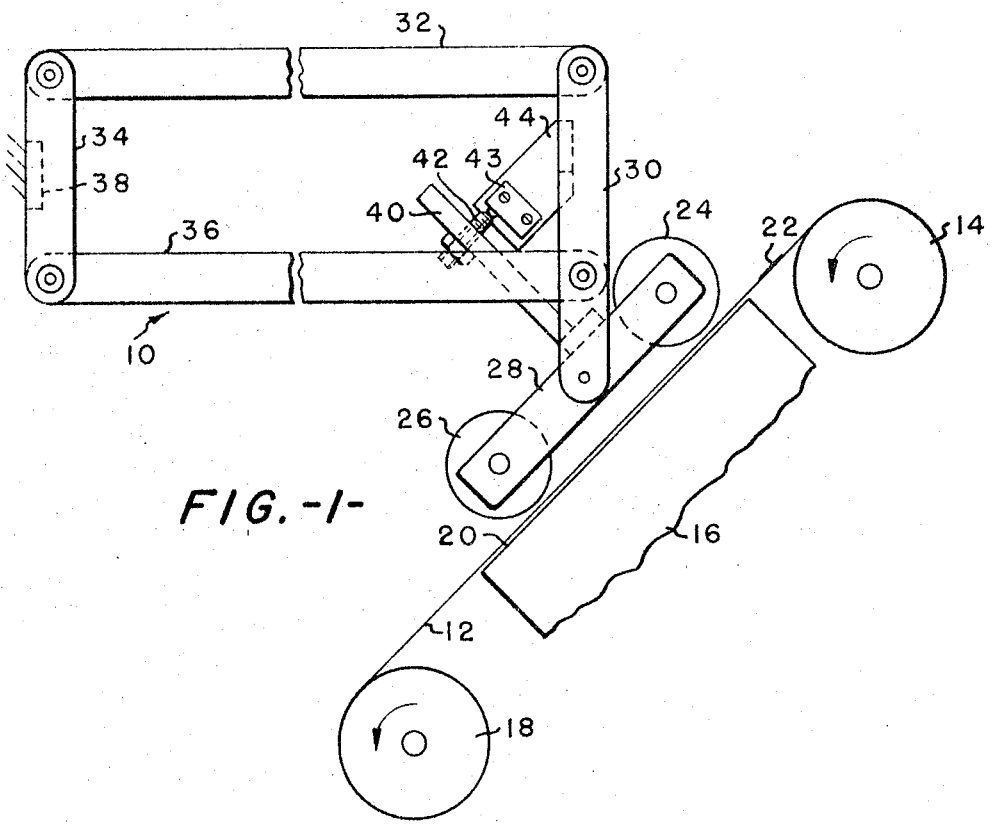
FIG.-1-
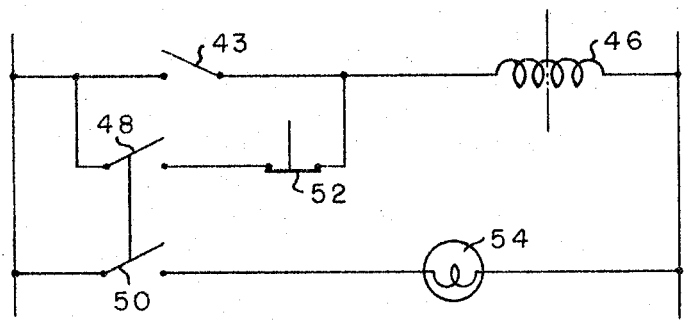
FIG.-2-
INVENTOR.
PHILIP N. SMITH
BY
Earle R. Marden
ATTORNEY

United States Patent Office 3,462,568
Patented Aug. 19, 1969

3,462,568
SEAM DETECTOR APPARATUS
Philip N. Smith, Spartanburg, S.C., assignor to Deering Milliken Research Corporation, Spartanburg, S.C., a Corporation of Delaware
Filed July 19, 1967, Ser. No. 654,615
Int. Cl. B65h 25/14
U.S. Cl. 200—61.13                               6 Claims

ABSTRACT OF THE DISCLOSURE

The apparatus is directed to a seam detector which can be used with any thickness of fabric without readjustment for the various thicknesses. A switch means is located in a fixed position relative to an arm which supports a pair of rolls and is pivotally attached to a parallelogram linkage system.

---

This invention relates generally to a flaw detection apparatus and more specifically to a seam detector which does not have to be readjusted any time a different thickness fabric is run.

Seam detectors to detect or sense a seam in a running length of fabric are known per se but the known devices have the serious drawback that they have to be readjusted every time a fabric of different thickness is run. This adjustment and readjustment takes considerable time and effort by the operator. Furthermore, if the operator is not skilled or is careless, the prior art seam detector may not even operate to detect the seam in the fabric being run. Also, it has been found that the operators have forgotten to readjust the seam detectors thereby causing a considerable amount of extra work.

Therefore, it is an object of this invention to provide a detector which does not require constant adjustment and readjustment.

Another object of the invention is to provide a seam detector which can be used on a multitude of fabrics with different thicknesses without readjustment for each thickness of fabric.

A third object of the invention is to provide a seam detector which is simple in construction and reliable in operation.

Other objects and advantages of the invention will become readily apparent as the specification proceeds to describe the invention with reference to the accompanying drawings, in which:

FIGURE 1 is a partially schematic view of the new and improved seam detector and FIGURE 2 is a simplified circuit diagram.

Seam detectors have been used for a number of years to automatically detect seams in running lengths of fabric for various reasons. The results of the detection of seams may be used to grade the fabric, locate the seam, count the number of seams in a piece to inform the customer, measure the number of yards in a piece of fabric between seams, etc. The basic purpose of this invention is to provide a reliable detector which will operate on a multiplicity of fabrics with varying thicknesses without constant supervision and adjustment by an operator. To this end the seam detector 10 in FIGURE 1 was developed and the signal received therefrom can be used to perform any of the above-mentioned functions. This detector can be used to detect most any type of fault in a fabric which results in an abrupt variation in the fabric being scanned.

Looking at FIGURE 1 the fabric 12 is shown being delivered from a supply roll 14 over a back-up member 16 to a take-up roll 18. The back-up member 16 has a planar upper surface 20 which cooperates with the seam detector 10. The back-up member 16 can be of any desired type such as an inspection table for inspection of the fabric. For purposes of illustration reference numeral 22 represents a seam in the fabric.

The seam detector 10 has a pair of wheels 24 and 26 rotatably supported to a wheel support member 28 which is pivotally secured to the linkage 30. Linkage 30 is one portion of the parallelogram or pantagraph linkage system consisting of linkages 30, 32, 34 and 36 with linkages 32 and 36 pivotally secured to linkages 30 and 34 so that linkages 32 and 36 move parallel to one another and linkage 30 moves parallel to linkage 34 which is rigidly secured to a suitable frame member 38. Rigidly attached to the wheel support member is an upright arm 40 at the top of which is an adjustable screw member 42 that engages a switch 43 rigidly secured to linkage 30 by a suitable support member 44. Preferably, switch 43 is of the type which will automatically close when the screw member 42 is moved away therefrom.

In operation when a seam 22 passes under wheel 24, wheel 24 will rise causing arm 40 and screw member 42 to move away from the switch 43, thereby allowing it to close. Looking now to FIGURE 2 it can be seen that closing of switch 43 will energize relay coil 46 which pulls in switches 48 and 50. Closing of switch 48 will maintain relay coil 46 energized until manual switch 52 is opened to break the circuit. This is necessary since closing of switch 43 is only momentary. At the same time switch 50 will be closed to energize a signal light 54 and maintain the light lit until switch 52 is opened to break the circuit. For the sake of illustration, we have shown a signal light 54 but obviously there are suitable devices which can be actuated such as a counter, stop motion device, etc.

The herein disclosed seam detector is reliable, simple in construction and will operate on various thicknesses of fabric without readjustment for each thickness of fabric. Furthermore, the herein disclosed seam detector does not require constant attention by an operator and thereby allows the operator to perform other necessary functions.

Although I have described in detail the preferred embodiment of my invention I contemplate that many changes may be made without departing from the scope or spirit of my invention.

That which is claimed is:

1. A detector comprising: means to contact a running length of material, a plurality of linkage members pivotally connected together to form a parallelogram supporting said material contact means and means operably associated with said linkage means and said material contact means to signal the detection of an abrupt change in the thickness in the material by said material contact means.

2. The structure of claim 1 wherein said material contact means includes a pair of rollers pivotally connected to one of said linkage members.

3. The structure of claim 2 wherein one of said linkage members is fixed relative to the other of said linkage members.

4. A detector comprising at least two pairs of linkage members with the linkage members of each pair being parallel to one another, each linkage member in one of said pairs being pivotally connected to both the linkage members in the other pair, means rigidly mounting one of said linkage members in the other of said pairs, a pair of roller means pivotally secured to said linkage member parallel to said rigidly mounted linkage member and means secured to one of said linkage members and said roller means to signal the detection of an abrupt change in the thickness of material by said roller means.

5. The structure of claim 4 wherein said signal means includes a switch means connected to said linkage member parallel to said rigidly mounted linkage member.

6. The structure of claim 5 wherein said roller means includes a roller support member rotatably supporting a pair of rollers therein, said roller support member being pivotally secured to said linkage member parallel to said rigidly mounted linkage means, said signal means including an arm secured to said roller support member and contacting said switch means in normal position.

References Cited

UNITED STATES PATENTS

| | | | |
|---|---|---|---|
| 2,523,184 | 9/1950 | Beall | 200—61.14 |
| 2,900,468 | 8/1959 | Joy | 200—61.13 |
| 3,166,651 | 1/1965 | Leimer et al. | 200—61.13 |

HERMAN O. JONES, Primary Examiner